(12) United States Patent
Hsu et al.

(10) Patent No.: US 10,490,114 B2
(45) Date of Patent: Nov. 26, 2019

(54) ELECTRONIC PAPER DISPLAY APPARATUS

(71) Applicant: E Ink Holdings Inc., Hsinchu (TW)

(72) Inventors: Kuo-Han Hsu, Hsinchu (TW); Mu-Chen Tan, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 15/853,880

(22) Filed: Dec. 25, 2017

(65) Prior Publication Data
US 2018/0211584 A1    Jul. 26, 2018

(30) Foreign Application Priority Data
Jan. 25, 2017   (CN) .......................... 2017 1 0061283

(51) Int. Cl.
*G09G 3/20* (2006.01)
*G09G 3/34* (2006.01)
(Continued)

(52) U.S. Cl.
CPC ......... *G09G 3/2092* (2013.01); *G09G 3/2003* (2013.01); *G09G 3/2007* (2013.01); *G09G 3/2096* (2013.01); *G09G 3/3433* (2013.01); *G09G 5/06* (2013.01); *G06F 3/1423* (2013.01); *G09G 2310/08* (2013.01); *G09G 2320/0666* (2013.01); *G09G 2340/0428* (2013.01); *G09G 2370/10* (2013.01); *G09G 2380/14* (2013.01)

(58) Field of Classification Search
CPC .. G09G 3/2092; G09G 3/2003; G09G 3/2007; G09G 3/3433; G09G 3/1423; G09G 2310/08; G09G 2320/0666
See application file for complete search history.

(56) References Cited

U.S. PATENT DOCUMENTS 6,204,883 B1 *  3/2001  Tsukagoshi ............. G06T 9/005
                                                            348/461
8,537,171 B2    9/2013  Higgins et al.
                          (Continued)

FOREIGN PATENT DOCUMENTS

CN      102097062    6/2011
TW      201023144    6/2010
                (Continued)

OTHER PUBLICATIONS

"Office Action of China Counterpart Application", dated Jun. 4, 2019, pp. 1-8.

*Primary Examiner* — Mark Edwards
(74) *Attorney, Agent, or Firm* — JCIPRNET

(57) ABSTRACT

An electronic paper display apparatus including an electronic paper display panel and a driver apparatus is provided. The electronic paper display panel displays image frames and includes a plurality of display modes. The driver apparatus is electrically connected to the electronic paper display panel. The driver apparatus determines what display mode the electronic paper display panel is in according to image data. The driver apparatus selects a driving signal to drive the electronic paper display panel to display the image frames according to the display mode of the electronic paper display panel. The image data is encoded according to one of a plurality of encoding methods to include information related to the display mode of the electronic paper display panel.

9 Claims, 1 Drawing Sheet

(51) Int. Cl.
*G09G 5/06* (2006.01)
*G06F 3/14* (2006.01)

(56) References Cited

U.S. PATENT DOCUMENTS

| | | |
|---|---|---|
| 8,842,104 B2 | 9/2014 | Peng et al. |
| 2003/0137521 A1* | 7/2003 | Zehner .................... G02F 1/167 345/589 |
| 2009/0102744 A1* | 4/2009 | Ram ..................... G06F 1/1601 345/1.1 |
| 2010/0277509 A1 | 11/2010 | Lu et al. |
| 2012/0092331 A1* | 4/2012 | Ogawa ................... G09G 3/003 345/419 |
| 2012/0169676 A1* | 7/2012 | Peng .................... G09G 3/2007 345/204 |
| 2013/0021229 A1 | 1/2013 | Ludden et al. |

FOREIGN PATENT DOCUMENTS

| | | |
|---|---|---|
| TW | 201211991 | 3/2012 |
| TW | 201346878 | 11/2013 |

\* cited by examiner

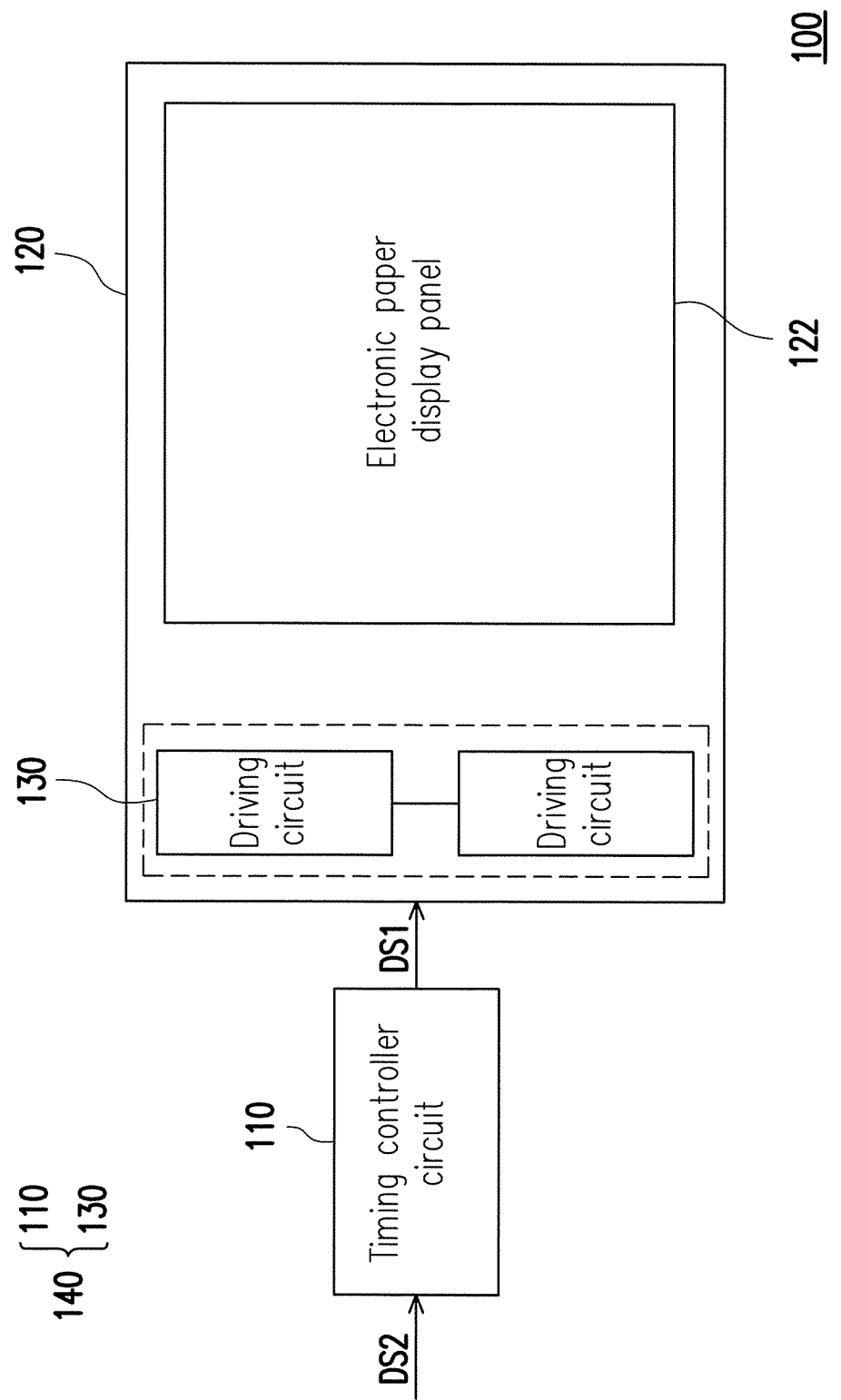

ELECTRONIC PAPER DISPLAY APPARATUS

CROSS-REFERENCE TO RELATED APPLICATION

This application claims the priority benefit of China application serial no. 201710061283.4, filed on Jan. 25, 2017. The entirety of the above-mentioned patent application is hereby incorporated by reference herein and made a part of this specification.

BACKGROUND

Field of the Invention

The invention relates to a display apparatus and more particularly, to an electronic paper display apparatus.

Description of Related Art

An electronic paper display apparatus is a new display apparatus. With advantages, such as thinness and lightness, durability and low power consumption for energy saving and environmental protection, the electronic paper display apparatus has been widely applied in electronic readers (e.g., electronic books, electronic newspaper) or other electronic components (e.g., electronic tags) on the market. In the existing technology, the electronic paper display apparatus usually has various display modes. In the current architecture, a system application master has to transmit messages or parameters related the display modes to a driver apparatus. In an aspect of software engineering, the parameters or the header messages must pass through different software layers for the transmission, and as a result, an interface communication issue may occur to a software interface due to the need of parameter transmission. In a larger software architecture, such manner requires a long-term plan and significant software modifications.

SUMMARY

The invention provides an electronic paper display apparatus having image data including information related to display modes of an electronic paper display panel thereof.

An electronic paper display apparatus of the invention includes an electronic paper display panel and a driver apparatus. The electronic paper display panel is configured to display an image frame and includes a plurality of different display modes. The driver apparatus is electrically connected to the electronic paper display panel. The driver apparatus is configured to determine which display mode the electronic paper display panel is in according to image data. The driver apparatus selects a driving signal to drive the electronic paper display panel to display the image frame according to the display mode of the electronic paper display panel. The image data is encoded according to one of a plurality of encoding methods to include information related to the display mode of the electronic paper display panel.

In an embodiment of the invention, the encoding methods include a plurality of color level tables. According to the display mode of the electronic paper display panel, one of the color level tables is selected to encode the image data.

In an embodiment of the invention, the different display modes correspond to different color level tables. Each of the color level tables includes a plurality of encoding sequences. Pixel data in the image data is encoded according to the encoding sequences of the selected color level table.

In an embodiment of the invention, the display mode of the electronic paper display panel includes a black-and-white display mode. The color level table corresponding to the black-and-white display mode includes two different encoding sequences. The driver apparatus determines that the display mode of the electronic paper display panel is the black-and-white display mode according to at least one of the two different encoding sequences.

In an embodiment of the invention, the black-and-white display mode includes a first black-and-white display mode and a second black-and-white display mode. The encoding sequences included in the color level tables corresponding to the first black-and-white display mode and the second black-and-white display mode are not the same.

In an embodiment of the invention, the display mode of the electronic paper display panel includes a grayscale display mode. The color level table corresponding to the grayscale display mode includes three or more different encoding sequences. The driver apparatus determines that display mode of the electronic paper display panel is the grayscale display mode according to at least one of the three or more different encoding sequences.

In an embodiment of the invention, the grayscale display mode includes a first grayscale display mode and a second grayscale display mode. The encoding sequences included in the color level tables corresponding to the first grayscale display mode and the second grayscale display mode are not the same.

In an embodiment of the invention, the different display modes correspond to different driving signals.

In an embodiment of the invention, the driver apparatus includes a software timing controller.

In an embodiment of the invention, the electronic paper display apparatus includes two display screens, and the electronic paper display panel serves as one of the two display screens.

To sum up, in the embodiments of the invention, the image data includes the information related to the display mode of the electronic paper display panel, and the driver apparatus determines which display mode the electronic paper display panel is in according to the image data.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic diagram illustrating an electronic paper display apparatus according to an embodiment of the invention.

DESCRIPTION OF EMBODIMENTS

Embodiments are provided below to describe the invention in detail, though the invention is not limited to the provided embodiments, and the provided embodiments can be suitably combined. The terms "coupled" and "electrically coupled" used in this specification (including claims) of the present application may refer to any direct or indirect connection means. For example, "a first apparatus is coupled or electrically coupled to a second apparatus" can be interpreted as "the first apparatus is directly connected to the second apparatus" or "the first apparatus is indirectly connected to the second apparatus through other connection means". In addition, the term "signal" can refer to a current, a voltage, a charge, a temperature, data, an electromagnetic wave or any one or multiple signals.

FIG. 1 is a schematic diagram illustrating an electronic paper display apparatus according to an embodiment of the invention. Referring to FIG. 1, an electronic paper display apparatus 100 of the present embodiment includes a driver apparatus 140 and an electronic paper display panel 120. The driver apparatus 140 is electrically connected to the electronic paper display panel 120. The driver apparatus 140 includes a timing controller circuit 110 and driving circuits 130. The electronic paper display panel 120 includes an active region 122. In the present embodiment, the driving circuits 130 are configured to drive the electronic paper display panel 120 to display image frames in the active region 122. In an embodiment, the driving circuits 130 may also be separated from the electronic paper display panel 120 and disposed outside the electronic paper display panel 120.

In the present embodiment, the electronic paper display panel 120 includes a plurality of different display modes, e.g., a quick display mode, an input method display mode, a high-quality (HQ) reading display mode and a high-quality (HQ) image display mode, though the number and category names thereof construe no limitations to the invention. In the present embodiment, the timing controller circuit 110 determines which display mode the electronic paper display panel 120 is in according to image data DS2. The timing controller circuit 110 selects a driving signal DS1 according to the display mode of the electronic paper display panel 120 and provides the driving signal DS1 to the driving circuits 130 to drive the electronic paper display panel 120 to display the image frames.

In the present embodiment, the image data DS2 is encoded according to one of a plurality of encoding methods to include information related to the display mode of the electronic paper display panel 120. In an embodiment, the image data DS2 may be encoded by employing, for example, an external microcontroller unit (MCU), a system on chip (SOC) or any other embedded system as a system application master. The system application master achieves controlling the display function of the electronic paper display panel 120 by controlling the timing controller circuit 110. In this application, the display control and the display mode of the electronic paper display panel 120 are selected by the system application master. Thus, the system application master may encode the image data DS2, such that the image data DS2 may include the information related to the display mode of the electronic paper display panel 120.

In the present embodiment, the encoding methods include a plurality of color level tables. According to the display mode of the electronic paper display panel 120, one of the color level tables is selected to encode the image data DS2. Table 1 below shows a plurality of color level tables of an embodiment of the invention, and each column corresponds to a color level table of a display mode.

TABLE 1

| Grayscale | Mode name | | | |
|---|---|---|---|---|
| | Quick display mode | Input method display mode | HQ reading display mode | HQ image display mode |
| All black | 11-00-00 | 00-00-12 | 00-00-00 | 04-04-04 |
| 1$^{st}$ gray | | | 18-18-18 | 14-14-14 |

TABLE 1-continued

| Grayscale | Mode name | | | |
|---|---|---|---|---|
| | Quick display mode | Input method display mode | HQ reading display mode | HQ image display mode |
| 2$^{nd}$ gray | | | 28-28-28 | 24-24-24 |
| 3$^{rd}$ gray | | | 38-38-38 | 34-34-34 |
| 4$^{th}$ gray | | | 48-48-48 | 44-44-44 |
| 5$^{th}$ gray | | | 58-58-58 | 54-54-54 |
| 6$^{th}$ gray | | | 68-68-68 | 64-64-64 |
| 7$^{th}$ gray | | | 78-78-78 | 74-74-74 |
| 8$^{th}$ gray | | | 88-88-88 | 84-84-84 |
| 9$^{th}$ gray | | | 98-98-98 | 94-94-94 |
| 10$^{th}$ gray | | | A8-A8-A8 | A4-A4-A4 |
| 11$^{th}$ gray | | | B8-B8-B8 | B4-B4-B4 |
| 12$^{th}$ gray | | | C8-C8-C8 | C4-C4-C4 |
| 13$^{th}$ gray | | | D8-D8-D8 | D4-D4-D4 |
| 14$^{th}$ gray | | | E8-E8-E8 | E4-E4-E4 |
| All white | EE-FF-FF | FF-EE-EC | FF-FF-FF | F4-F4-F4 |

In Table 1, different display modes correspond to different color level tables. Each color level table includes a plurality of encoding sequences. In the present embodiment, the quick display mode and the input method display mode are, for example, black-and-white display modes. The encoding sequences included in the color level tables corresponding to the quick display mode and the input method display mode are not the same. For example, if the electronic paper display panel 120 is about to display the image frame in the quick display mode, black pixel data contained in the image data DS2 is encoded by, for example, an encoding sequence of "11-00-00", and white pixel data is encoded by, for example, an encoding sequence of "EE-FF-FF". If the electronic paper display panel 120 is about to display the image frame in the input method display mode, the black pixel data contained in the image data DS2 is encoded by, for example, an encoding sequence of "00-00-12", and the white pixel data is encoded by, for example, an encoding sequence of "FF-EE-EC".

In the present embodiment, the HQ reading display mode and the HQ image display mode are, for example, grayscale display modes, in which three or more different grayscales may be displayed. Thus, the encoding sequences included in the color level tables corresponding to the HQ reading display mode and the HQ image display mode are not the same. For example, if the electronic paper display panel 120 is about to display the image frame in the HQ reading display mode, the black pixel data contained in the image data DS2 is encoded by, for example, an encoding sequence of "00-00-00", the white pixel data is encoded by, for example, an encoding sequence of "FF-FF-FF", and gray pixel data (e.g., first gray) is encoded by, for example, an encoding sequence of "18-18-18". The encoding sequences corresponding to the rest of the gray pixel data may be derived according to those listed in the table and will not be repeatedly described. If the electronic paper display panel 120 is about to display the image frame in the HQ image display mode, the black pixel data contained in the image data DS2 is encoded by, for example, an encoding sequence of "04-04-04", the white pixel data is encoded by, for example, an encoding sequence of "F4-F4-F4", and the gray pixel data (e.g., the first gray) is encoded by, for example, an encoding sequence of "14-14-14". The encoding sequences corresponding to the rest of the gray pixel data may be derived according to those listed in the table and will not be repeatedly described.

In the present embodiment, the timing controller circuit 110 may determine which display mode the electronic paper display panel 120 is in according to at least one of the different encoding sequences. For example, if the black pixel data contained in the image data DS2 is encoded by the encoding sequence of "00-00-00", the timing controller circuit 110 may determine that the display mode of the electronic paper display panel 120 is the HQ reading display mode, thereby selecting and transmitting a driving waveform corresponding to the HQ reading display mode to the driving circuits 130. A method of the timing controller circuit 110 determining the display mode of the electronic paper display panel 120 according to the encoding sequences corresponding to the pixel data may be understood with reference to Table 1 and will not be repeatedly described hereinafter.

In the present embodiment, a color level table is a representation rule of the pixel data, in which different values are used to represent different colors (gray colors) and display modes in the pixel data, thereby including the information related to the mode in the pixel data. The color level tables listed in Table 1 are only for illustration, and the invention is not limited thereto. Additionally, in the present embodiment, the timing controller circuit 110 selects different driving signals corresponding to different display modes, and since enough instructions and recommendations for detailed steps and implementation of driving methods with respect to the driving signals can be learned from general acknowledge of the related technical field, detailed description thereof is not repeated.

In the present embodiment, the timing controller circuit 110 is, for example, a software timing controller. In this application, capabilities of a hardware timing controller may be replaced by a microcontroller unit (MCU) or a central processing unit (CPU) in a manner of software processing. In this circumstance, the electronic paper display apparatus 100 does not require an external hardware timing controller, which may achieve enhanced performance, reduced cost and significantly shortened product development process. Thus, the electronic paper display apparatus 100 is adapted to be applied in mobile communication apparatuses, such as dual-screen cell phones or phone back shells. Thus, in an embodiment, the electronic paper display apparatus 100 includes two or more display screens, for example, and the electronic paper display panel 120 serves as one of the two screens, while a panel of another display screen may be a liquid-crystal display (LCD) panel or an organic light-emitting diode (OLED) panel or any combination thereof, but the invention is not limited thereto.

To summarize, in the embodiments of the invention, the driving method is at least adapted for the electronic paper display apparatus requiring to be switched among a plurality of display modes, which can achieve the transmission of the mode information, without the condition that the parameters or header messages being transmitted. In the aspect of software engineering, the implementation of the parameter or the header message passing through different software layer for the transmission can be omitted, and the interface communication issue occurring to the software interface due to the need of parameter transmission can be prevented, such that the transmission of the mode information can be achieved without changing the image transmission process.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electronic paper display apparatus, comprising:
    an electronic paper display panel, configured to display an image frame and comprising a plurality of different display modes; and
    a driver apparatus, electrically connected to the electronic paper display panel, configured to determine which display mode the electronic paper display panel is in according to image data, and select one driving signal of a plurality of driving signals to drive the electronic paper display panel to display the image frame according to the display mode of the electronic paper display panel,
    wherein the image data is encoded according to one of a plurality of encoding methods to comprise information related to the display mode of the electronic paper display panel,
    wherein the different display modes correspond to different driving signals.

2. The electronic paper display apparatus according to claim 1, wherein the encoding methods comprise a plurality of color level tables, and one of the color level tables is selected to encode the image data according to the display mode of the electronic paper display panel.

3. The electronic paper display apparatus according to claim 2, wherein the different display modes correspond to different color level tables, each of the color level tables comprises a plurality of encoding sequences, and pixel data in the image data is encoded according to the encoding sequences of the selected color level table.

4. The electronic paper display apparatus according to claim 3, wherein the display mode of the electronic paper display panel comprises a black-and-white display mode, the color level table corresponding to the black-and-white display mode comprises two different encoding sequences, and the driver apparatus determines that the display mode of the electronic paper display panel is the black-and-white display mode according to at least one of the two different encoding sequences.

5. The electronic paper display apparatus according to claim 4, wherein the black-and-white display mode comprises a first black-and-white display mode and a second black-and-white display mode, and the encoding sequences comprised in the color level tables corresponding to the first black-and-white display mode and the second black-and-white display mode are not the same.

6. The electronic paper display apparatus according to claim 3, wherein the display mode of the electronic paper display panel comprises a grayscale display mode, the color level table corresponding to the grayscale display mode comprises three or more different encoding sequences, and the driver apparatus determines that display mode of the electronic paper display panel is the grayscale display mode according to at least one of the three or more different encoding sequences.

7. The electronic paper display apparatus according to claim 6, wherein the grayscale display mode comprises a first grayscale display mode and a second grayscale display mode, and the encoding sequences comprised in the color level tables corresponding to the first grayscale display mode and the second grayscale display mode are not the same.

8. The electronic paper display apparatus according to claim 1, wherein the driver apparatus comprises a software timing controller.

9. The electronic paper display apparatus according to claim 1, wherein the electronic paper display apparatus comprises two display screens, and the electronic paper display panel serves as one of the two display screens.

* * * * *